United States Patent
Sonoda et al.

(10) Patent No.: US 10,166,642 B2
(45) Date of Patent: Jan. 1, 2019

(54) DRIVE APPARATUS COMPRISING MECHANICAL VIBRATION SUPPRESSION FUNCTION, AND SYSTEM COMPRISING MECHANICAL VIBRATION SUPPRESSION FUNCTION

(71) Applicant: FANUC CORPORATION, Minamitsuru-gun, Yamanashi (JP)

(72) Inventors: Naoto Sonoda, Yamanashi (JP); Yukio Toyozawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/711,466

(22) Filed: Sep. 21, 2017

(65) Prior Publication Data

US 2018/0085872 A1 Mar. 29, 2018

(30) Foreign Application Priority Data

Sep. 26, 2016 (JP) .................. 2016-186773

(51) Int. Cl.
*H02P 7/00* (2016.01)
*B23Q 11/00* (2006.01)
(Continued)

(52) U.S. Cl.
CPC ........ *B23Q 11/0039* (2013.01); *F16F 15/002* (2013.01); *F16F 15/02* (2013.01); *G05B 19/00* (2013.01)

(58) Field of Classification Search
CPC ..... B23Q 11/0039; F16F 15/002; F16F 15/02; G05B 19/00
(Continued)

(56) References Cited

U.S. PATENT DOCUMENTS 6,654,098 B2 11/2003 Asano et al.
9,340,088 B2 * 5/2016 Otake .................. B60G 17/08
(Continued)

FOREIGN PATENT DOCUMENTS

JP 2001-195130 7/2001
JP 2001-345244 12/2001
(Continued)

OTHER PUBLICATIONS

Notification of Reasons for Refusal dated Aug. 21, 2018 in corresponding Japanese Patent Application No. 2016-186773.

*Primary Examiner* — Eduardo Colon Santana
*Assistant Examiner* — Gabriel Agared
(74) *Attorney, Agent, or Firm* — Wenderoth, Lind & Ponack, L.L.P.

(57) ABSTRACT

An apparatus or system comprises: a damper side linear motor; a drive side linear motor; a first detection unit that detects a first position that is a position of a movable portion of the drive side linear motor in relation to a machine base; a second detection unit that detects a second position that is a position of a movable portion of the damper side linear motor in relation to the machine base; a third detection unit that detects a third position that is a position of the movable portion of the drive side linear motor in relation to the movable portion of the damper side linear motor; a drive side control unit that controls the drive side linear motor, based on the first position and the third position; and a damper side control unit that controls the damper side linear motor, based on the second position.

6 Claims, 4 Drawing Sheets

(51) Int. Cl.
  *F16F 15/00*  (2006.01)
  *F16F 15/02*  (2006.01)
  *G05B 19/00*  (2006.01)

(58) Field of Classification Search
  USPC .......................................................... 318/135
  See application file for complete search history.

(56) References Cited

U.S. PATENT DOCUMENTS

| | | | |
|---|---|---|---|
| 2001/0015799 | A1 | 8/2001 | Asano et al. |
| 2005/0113977 | A1* | 5/2005 | Nihei ................. B25J 9/102 700/245 |
| 2008/0043212 | A1* | 2/2008 | Shibazaki ............. G01D 5/38 355/53 |
| 2009/0103071 | A1* | 4/2009 | Yasunobe ............ F16C 29/025 355/73 |
| 2009/0170014 | A1* | 7/2009 | Shibazaki ............ G03F 7/201 430/5 |
| 2016/0252896 | A1* | 9/2016 | Nakamura ........... G05B 11/011 318/611 |
| 2016/0329837 | A1* | 11/2016 | Kataoka ................ H02N 2/142 |

FOREIGN PATENT DOCUMENTS

| | | |
|---|---|---|
| JP | 2003-045939 | 2/2003 |
| JP | 2003-195945 | 7/2003 |
| JP | 4638980 | 2/2011 |
| WO | 2008/066035 | 6/2008 |

* cited by examiner

DRIVE APPARATUS COMPRISING MECHANICAL VIBRATION SUPPRESSION FUNCTION, AND SYSTEM COMPRISING MECHANICAL VIBRATION SUPPRESSION FUNCTION

This application is based on and claims the benefit of priority from Japanese Patent Application No. 2016-186773, filed on 26 Sep. 2016, the content of which is incorporated herein by reference.

BACKGROUND OF THE INVENTION

Field of the Invention

The present invention relates to a drive apparatus comprising a mechanical vibration suppression function, and a system comprising the mechanical vibration suppression function, the apparatus or system suppressing mechanical vibration.

Related Art

Conventionally, in order that a driven object for processing a work piece reciprocates, a mechanism combining a rotating servo motor and a ball screw for converting this rotational motion into linear motion has been widely used. However, in recent years, there is a demand for causing a driven object to reciprocate at high acceleration, and along with this, a linear motor capable of causing a driven object to reciprocate at high acceleration is commonly used.

In this regard, when a linear motor causes a driven object to reciprocate, the reciprocation may generate noise or vibration, which has been a problem. In particular, when a driven object or a work piece shakes due to vibration generated, the positional relationship between the driven object and the work piece may fluctuate, reducing the processing accuracy, which has been another problem.

Examples of technologies for suppressing noise or vibration from being generated, taking into consideration such problems, are disclosed in Patent Documents 1 and 2. According to the technology disclosed in Patent Document 1, two sliders driven by a linear motor are provided, and the two sliders are arranged back to back on a linearly extending track rail provided on a base. The two sliders reciprocate in opposite directions on the track rail, and such reciprocation of the two sliders generates acceleration to cancel mutual reaction forces. Specifically, commands are provided to the two sliders, respectively, whereby the two sliders are simultaneously moved on the track rail in directions separating from each other, or directions approaching each other. As a result, since the reaction forces generated in the two sliders will cancel each other, the reaction forces generated in the two sliders can be reduced, and noise or vibration generated due to such reaction forces generated in the two sliders can be reduced.

According to the technology disclosed in Patent Document 2 as well, similar to Patent Document 1, two linear movable portions are provided, and commands are provided such that the linear movable portions will move in directions to cancel mutual forces. As a result, vibration or noise can be suppressed from being generated.

Patent Document 1: Japanese Patent No. 4638980
Patent Document 2: Japanese Unexamined Patent Application, Publication No. 2001-195130

As set forth above, noise or vibration generated due to reciprocating motion of a linear movable portion can be suppressed by utilizing the technology disclosed in Patent Document 1 or 2. However, in order to utilize such technologies, it has been required to continuously provide two different commands, which correspond to the two linear movable portions, respectively.

For example, in order to utilize the technology disclosed in Patent Document 1, it has been required to continuously provide the two sliders, respectively, with commands for moving the two sliders in opposite directions. Moreover, it is not only necessary to simply move the sliders in opposite directions, but also to synchronize such movements of opposite directions, and it has been difficult to perform such control of synchronization by generating synchronization commands.

Further, the technology disclosed in Patent Document 1 assumes moving the two sliders having the same structure, shape and weight, whereas the technology disclosed in Patent Document 2 assumes moving a stage and a surface plate having different shapes and weights. In such a case of having different weights, etc., it has been required to provide synchronization commands to the stage and the surface plate, respectively, taking into consideration the weight ratio, etc., which has made it further difficult to perform control based on synchronization commands.

Against such a background, the present invention aims to provide a drive apparatus comprising a mechanical vibration suppression function, and a system comprising the mechanical vibration suppression function, capable of suppressing vibration generated in association with mechanical operations without requiring control based on complicated synchronization commands.

(1) A first aspect of the present invention is a drive apparatus (e.g., a drive apparatus 1 to be described later) including a mechanical vibration suppression function, in which the drive apparatus comprises: a damper side linear motor including a stationary portion (e.g., damper stationary portion 230 to be described later) and a movable portion (e.g., damper movable portion 220 to be described later), the stationary portion being fixed to a machine base (e.g., machine base 400 to be described later); a drive side linear motor including a stationary portion (e.g., linear stationary portion 130 to be described later) and a movable portion (e.g., linear movable portion 120 to be described later), the stationary portion being fixed to the movable portion of the damper side linear motor; a first detection unit (e.g., first detector 310 to be described later) that detects a first position that is a position of the movable portion of the drive side linear motor in relation to the machine base; a second detection unit (e.g., second detector 320 to be described later) that detects a second position that is a position of the movable portion of the damper side linear motor in relation to the machine base; a third detection unit (e.g., third detector 330 to be described later) that detects a third position that is a position of the movable portion of the drive side linear motor in relation to the movable portion of the damper side linear motor; a drive side control unit (e.g., linear side control unit 110 to be described later) that controls the drive side linear motor, based on the first position detected by way of the first detection unit and the third position detected by way of the third detection unit; and a damper side control unit (e.g., damper side control unit 210 to be described later) that controls the damper side linear motor, based on the second position detected by way of the second detection unit, thereby causing the damper side linear motor to function as a damper.

(2) As a second aspect of the drive apparatus including the mechanical vibration suppression function according to the first aspect, a response band of the damper side control unit may be a response band that is lower than a command frequency band provided to the drive side control unit or a response band of the drive side control unit.

(3) As a third aspect of the drive apparatus including the mechanical vibration suppression function according to the first or second aspect, adjustment of a response band of the damper side control unit may be allowed in accordance with a command frequency band provided to the drive side control unit or a response band of the drive side control unit.

(4) As a fourth aspect of the drive apparatus including the mechanical vibration suppression function according to the third aspect, the adjustment may be performed by adjusting a parameter (e.g., proportional gain in positional loop control to be described later) used by the damper side control unit to control the damper side linear motor.

(5) As a fifth aspect of the drive apparatus including the mechanical vibration suppression function according to any one of the first to fourth aspects, the third detection unit may calculate a difference between the first position detected by way of the first detection unit and the second position detected by way of the second detection unit, and may detect the third above position from the difference calculated.

(6) As a sixth aspect of the drive apparatus including the mechanical vibration suppression function according to any one of the first to fifth aspects, weight of the damper side linear motor may be heavier than weight of the drive side linear motor.

(7) As a seventh aspect of the drive apparatus including the mechanical vibration suppression function according to any one of the first to sixth aspects, the drive side linear motor may be driven thereby causing the drive apparatus including the mechanical vibration suppression function to function as a machine tool.

(8) An eighth aspect of the present invention is a system including a mechanical vibration suppression function, in which the system comprises the drive apparatus including the mechanical vibration suppression function according to any one of the first to seventh aspects and a high-level control device (e.g., high-level control device 111 to be described later), in which each of the drive side control unit and the damper side control unit is a control unit that performs feedback control, and the high-level control device provides a position command to the drive side control unit, and does not provide a position command to the damper side control unit.

According to the present invention, vibration generated in association with mechanical operations can be suppressed without requiring control based on complicated synchronization commands.

DETAILED DESCRIPTION OF THE INVENTION

At first, an outline of the present embodiment is described. According to the present embodiment, a linear motor is two-tiered (the upper tier is hereinafter referred to as "linear shaft", and the lower tier as "damper shaft"), whereby a force generated in the linear shaft is absorbed by the damper shaft. In this manner, a reaction force generated from the reciprocating motion of each movable portion is prevented from transmitting to a machine base, on which the linear motor is installed. In particular, vibration of the machine base due to high acceleration is reduced, when the linear shaft having high-frequency oscillation has high-frequency motion due to high speed.

In this regard, according to the prior art such as disclosed in Patent Document 1, a drive system corresponding to the damper shaft and a drive system corresponding to the linear shaft are synchronized and driven based on commands to cancel mutual forces. However, it has been difficult to provide the shafts with synchronization commands, respectively, to operate in such synchronization.

In contrast, according to the present embodiment, the damper shaft has low-frequency characteristics which would not respond to high-frequency oscillation provided to the linear shaft, while the damper shaft is provided with a command being zero. Further, the linear shaft is positioned by using a detector attached to the machine base. In this manner, the damper shaft moves freely in response to high-frequency oscillation, and can be positioned at the same position in response to low frequency. As a result, according to the present embodiment, a synchronization command is not provided to the damper shaft, and a reaction force when driving the linear shaft is not provided to the machine base; therefore, mechanical vibration can be suppressed. More specifically, the present embodiment can solve the problem of "suppressing vibration generated in association with mechanical operations without requiring control based on complicated synchronization commands", as described above. The outline of the present embodiment has been described above.

Figure 1:
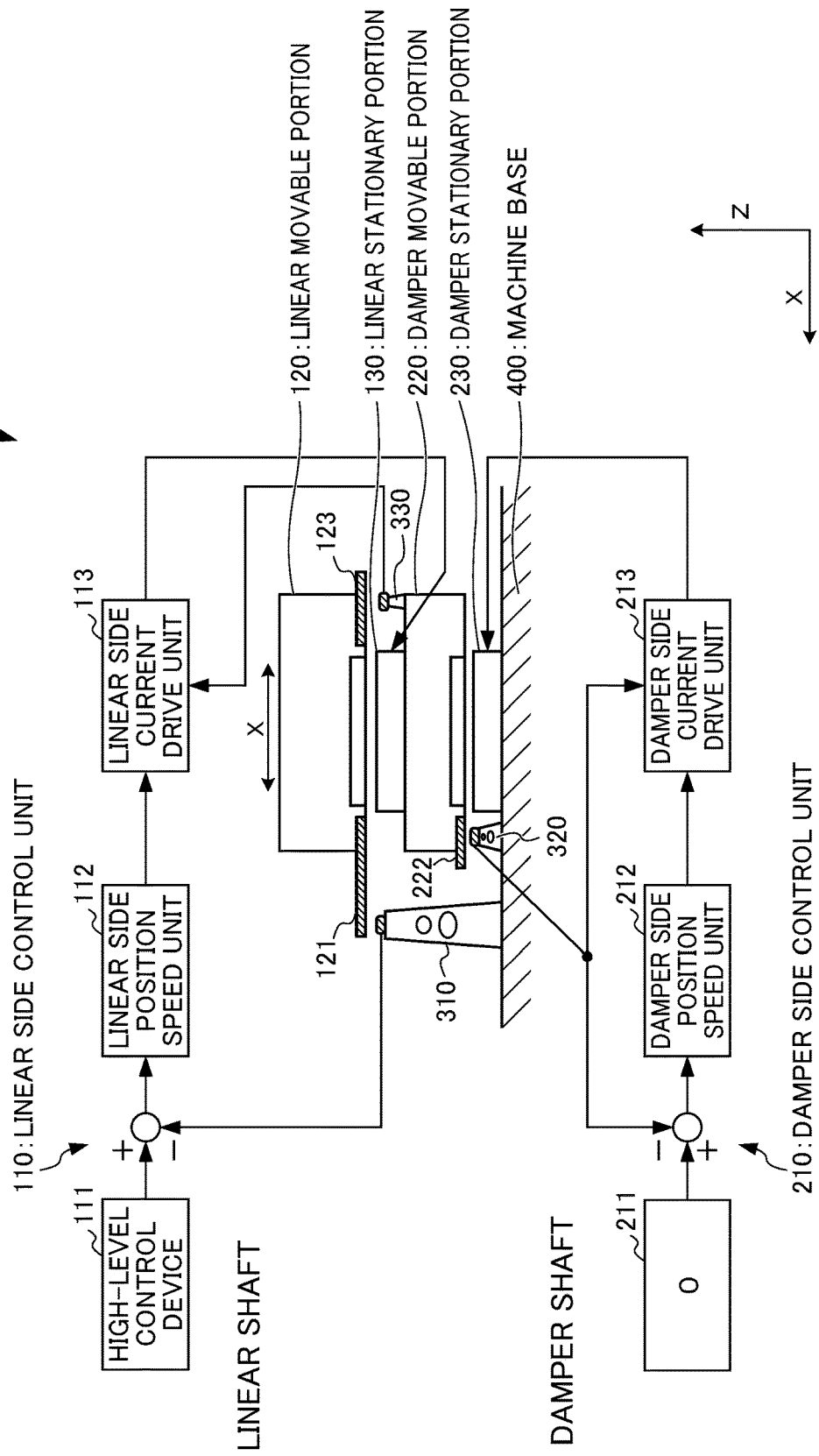
FIG. 1 is a diagram illustrating a total configuration according to an embodiment of the present invention.

Next, the present embodiment is described in detail with reference to the drawings. At first, a total configuration of the present embodiment is described with reference to FIG. 1. As illustrated in FIG. 1, a drive apparatus 1 is a drive apparatus having a vibration suppression function according to the present embodiment, in which the damper shaft includes: a damper stationary portion 230 being a linear motor installed on a machine base 400; and a damper movable portion 220 reciprocating in the X axis direction along the linear guides provided to the damper stationary portion 230. Further, the linear shaft includes: a linear stationary portion 130 being a linear motor installed on the damper movable portion 220; and a linear movable portion 120 reciprocating in the X axis direction along the linear guides provided to the linear stationary portion 130. More specifically, the present embodiment has a two-tiered configuration including a linear motor serving as the linear shaft and another linear motor serving as the damper shaft. Further, the drive apparatus 1 includes: a linear shaft side control unit 110 that controls drive of the linear shaft; and a damper side control unit 210 that controls drive of the damper shaft.

Here, as illustrated at the bottom right corner of the drawing, the X-axis is an axis corresponding to the direction of the reciprocating motion of the linear movable portion 120 and the damper movable portion 220 as described above; the Z-axis is an axis extending in the height direction orthogonal to the X-axis; and FIG. 1 is a diagram illustrating an XZ-plane composed of the X- and Z-axes in a planar view.

The linear movable portion 120 includes, for example, a turning tool (illustration omitted) as a tool for processing a work piece. As the linear movable portion 120 reciprocates in the X-axis direction, the turning tool reciprocates likewise in the X-axis direction to process a work piece. This reciprocating motion is implemented based on control by the linear side control unit 110. In order to perform such control by the linear side control unit 110, the linear side control unit 110 needs to be notified of a current position of the linear movable portion 120 in relation to the machine base 400, and a current position of the linear movable portion 120 in relation to the damper movable portion 220.

To this end, the linear movable portion 120 includes a first linear scale 121. The machine base 400 is provided with a first detector 310 for reading the first linear scale 121 thereby detecting a current position of the linear movable portion 120 in relation to the machine base 400. The current position of the linear movable portion 120 in relation to the machine base 400 is detected by way of the first detector 310, and is output to the linear side control unit 110.

Likewise, the linear movable portion 120 includes a third linear scale 123. The machine base 400 is provided with a third detector 330 for reading the third linear scale 123 thereby detecting a current position of the linear movable portion 120 in relation to the damper movable portion 220. Here, the current position of the linear movable portion 120 in relation to the damper movable portion 220 corresponds to a magnetic pole position of the linear movable portion 120. The current position of the linear movable portion 120 in relation to the damper movable portion 220 is detected by way of the third detector 330, and is output to the linear side control unit 110.

The linear side control unit 110 is connected to a high-level control device 111. The linear side control unit 110 includes a linear side position speed unit 112 and a linear side current drive unit 113.

The high-level control device 111 is a device which provides a position command for processing a work piece, as a linear side position command, to the linear side position speed unit 112. The high-level control device 111 is implemented by, for example, Computer Numerical Control (CNC).

The linear side position speed unit 112 calculates a positional deviation amount by subtracting first positional feedback provided from the first detector 310, from a linear side position command provided from the high-level control device 111. The linear side position speed unit 112 generates a linear side current command by performing positional control and speed control, based on the positional deviation amount calculated. In addition, the linear side position speed unit 112 outputs the linear side current command generated to the linear side current drive unit 113.

The linear side current drive unit 113 generates a linear side drive current, based on the linear side current command provided from the linear side position speed unit 112, and the third positional feedback provided from the third detector 330. The linear side current drive unit 113 switches the magnetic poles of the linear stationary portion 130 by way of the linear side drive current generated, thereby implementing a reciprocating motion of the linear movable portion 120. In this manner, the linear movable portion 120 will move at position and speed in accordance with the linear side position command provided from the high-level control device 111, allowing a work piece to be processed into a desired shape, based on a setup by a user, etc.

The damper movable portion 220 reciprocates to generate a reaction force which would cancel the reciprocating motion of the linear movable portion 120, in order that the damper shaft absorbs the force generated in the linear shaft. Such reciprocating motion of the damper movable portion 220 is implemented based on control by the damper side control unit 210. In order to perform such control by the damper side control unit 210, the damper side control unit 210 needs to be notified of a current position of the damper movable portion 220 in relation to the machine base 400.

To this end, the damper movable portion 220 includes a second linear scale 222. The machine base 400 is provided with a second detector 320 for reading the second linear scale 222 thereby detecting a current position of the damper movable portion 220 in relation to the machine base 400. The current position of the damper movable portion 220 in relation to the machine base 400 is detected by way of the second detector 320, and is output to the damper side control unit 210.

The damper side control unit 210 includes a damper side zero value output unit 211, a damper side position speed unit 212, and a damper side current drive unit 213. The damper side zero value output unit 211 outputs a damper side position command. However, according to the present embodiment, the damper side position command is a pro forma name, and is not generated or output in accordance with the situation, and a zero value is invariably output as a damper side position command. In other words, according to the present embodiment, it is not substantially required to generate a damper side position command. That is to say, a synchronization command for synchronizing the linear shaft and the damper shaft does not need to be generated. This is as described at the beginning of the description of the present embodiment. Note that, in the drawings, a zero-value corresponding to the output is depicted in the functional block corresponding to the damper side zero value output unit 211.

The damper side position speed unit 212 calculates a positional deviation amount by subtracting second positional feedback provided from the second detector 320, from a damper side position command (i.e. zero-value) provided from the high-level control device 111. The damper side position speed unit 212 generates a damper side current command by performing positional control and speed control, based on the positional deviation amount calculated. In addition, the damper side position speed unit 212 outputs the damper side current command generated to the damper side current drive unit 213.

The damper side current drive unit 213 generates a damper side drive current, based on the damper side current command provided from the damper side position speed unit 212, and the second positional feedback provided from the second detector 320. The damper side current drive unit 213 switches the magnetic poles of the damper stationary portion 230 by way of the damper side drive current generated, thereby implementing a reciprocating motion of the damper movable portion 220. In this manner, the damper shaft can absorb the force generated in the linear shaft. Therefore, vibration and noise can be suppressed from being generated.

Figure 2:
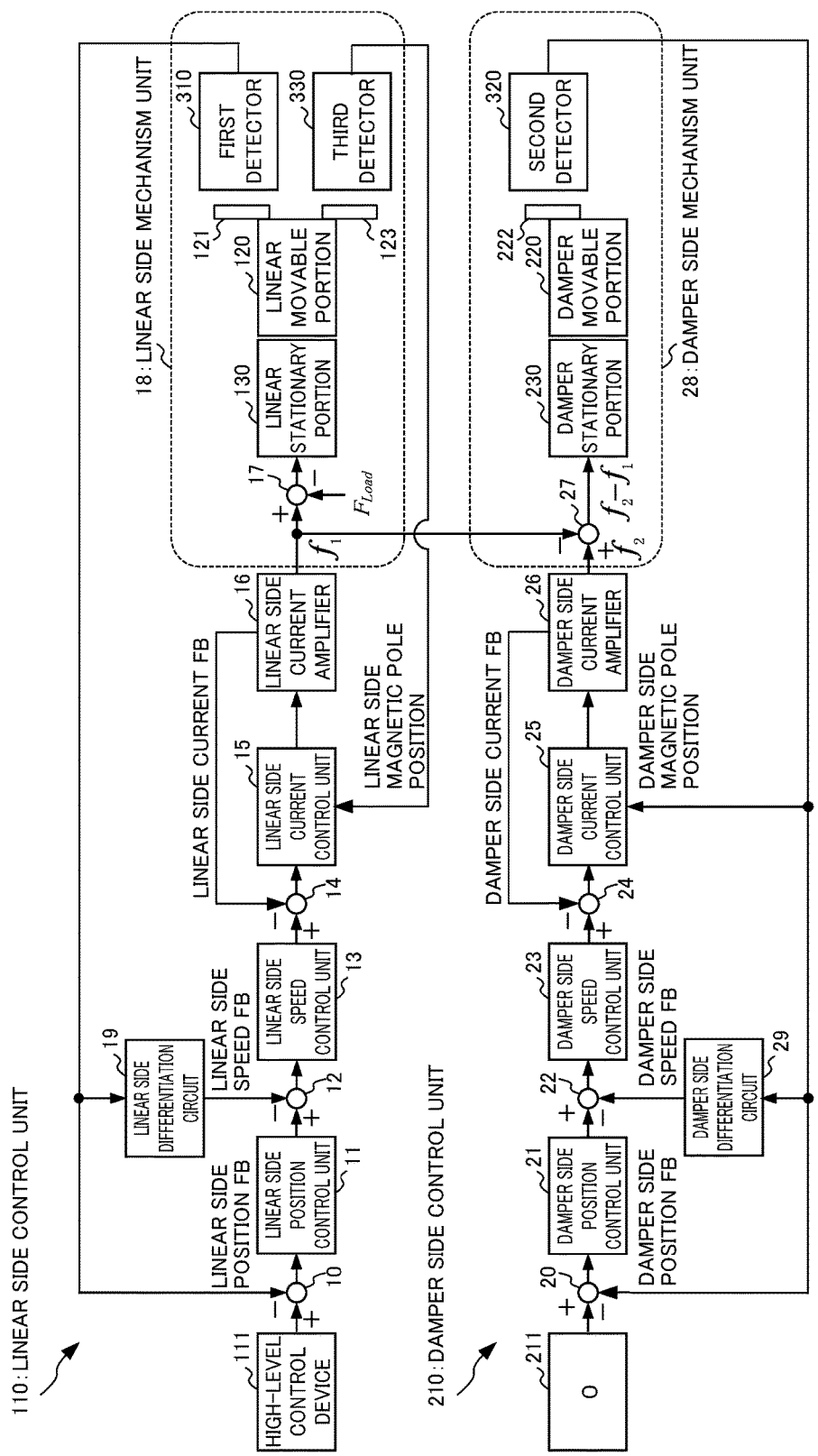
FIG. 2 is diagram illustrating a configuration and signal flow in relation to each control circuit according to the embodiment of the present invention.

Next, a further detailed configuration of the present embodiment is described with reference to FIG. 2. FIG. 2 is diagram illustrating a further detailed configuration and signal flow in relation to each control circuit illustrated in FIG. 1. Here, a linear side position control unit 11, a linear side speed control unit 13, and a linear side differentiation circuit 19 of FIG. 2 constitute a section corresponding to the linear side position speed unit 112 of FIG. 1. Further, a linear side current control unit 15 and a linear side current amplifier 16 of FIG. 2 constitute a section corresponding to the linear side current drive unit 113 of FIG. 1. Likewise, a damper side position control unit 21, a damper side speed control unit 23, and a damper side differentiation circuit 29 of FIG. 2 constitute a section corresponding to the damper side position speed unit 212 of FIG. 1. A damper side current control unit 25 and a damper side current amplifier 26 of FIG. 2 constitute a section corresponding to the damper side current drive unit 213 of FIG. 1.

At first, the linear shaft is described. The high-level control device 111 outputs a linear side position command to the linear side position control unit 11 for each predetermined cycle, based on an operation program or the like. Each unit downstream of the linear side position control unit 11 reads this linear side position command, performs positional control, speed control, and current control for each predetermined cycle, and switches the magnetic poles of the linear stationary portion 130, thereby driving the linear movable portion 120.

A subtractor 10 is arranged between the high-level control device 111 and the linear side position control unit 11. The subtractor 10 subtracts the linear side positional feedback detected by way of the first detector 310, from the position command being output from the high-level control device 111. Here, the linear side positional feedback detected by way of the first detector 310 refers to "a current position of the linear movable portion 120 in relation to the machine base 400" as described above with reference to FIG. 1. Note that feedback is simply depicted as "FB" in the drawings. Further, the subtractor 10 outputs a post-subtraction value to the linear side position control unit 11. Here, such a post-subtraction value serves as a linear side positional deviation amount.

The linear side position control unit 11 generates a linear side speed command by way of positional loop processing of performing a proportional operation, based on the linear side positional deviation amount, and outputs the linear side speed command generated to the linear side speed control unit 13.

A subtractor 12 is arranged between the linear side position control unit 11 and the linear side speed control unit 13. The subtractor 12 subtracts the linear side speed feedback being output from the linear side differentiation circuit 19 to be described later, from the linear side speed command being output from the linear side position control unit 11. Further, the subtractor 12 outputs a post-subtraction value to the linear side speed control unit 13. Here, such a post-subtraction value serves as a linear side speed deviation amount.

The linear side speed control unit 13 outputs a linear side current command by way of speed loop processing such as performing a proportional operation or an integration operation, based on the linear side speed deviation amount. Note that a current command may also be referred to as a torque command.

A subtractor 14 is arranged between the linear side speed control unit 13 and the linear side current control unit 15. The subtractor 14 subtracts current feedback being provided from the linear side current amplifier 16 to be described later, from the linear side current command being output from the linear side speed control unit 13. In this manner, current loop control is implemented. Further, the subtractor 14 outputs a post-subtraction value to the linear side current control unit 15. Here, such a post-subtraction value serves as a linear side current deviation amount.

The linear side current control unit 15 generates a linear side voltage command, based on the linear side current deviation amount and a linear side magnetic pole position detected by way of the third detector 330. Here, the linear side magnetic pole position detected by way of the third detector 330 refers to "a current position of the linear movable portion 120 in relation to the damper movable portion 220" as described above with reference to FIG. 1. The linear side current control unit 15 outputs the linear side voltage command generated to the linear side current amplifier 16.

Based on the linear side voltage command, the linear side current amplifier 16 switches the magnetic poles of the linear stationary portion 130, thereby forming a linear side drive current for driving the linear movable portion 120, and outputs the linear side drive current to the linear stationary portion 130. Subsequent descriptions assume that, in the drawings, the linear side drive current is output to a linear side mechanism unit 18 including the linear stationary portion 130.

Note that, on the other hand, the linear side current amplifier 16 generates linear side current feedback, based on the linear side drive current being output from itself. The linear side current amplifier 16 outputs the linear side current feedback generated to a subtractor 14 arranged between the linear side speed control unit 13 and the linear side current control unit 15.

Next, the linear side mechanism unit 18 is described. The linear side drive current being output to the linear side mechanism unit 18 (i.e. being output to the linear stationary portion 130) generates thrust $F_1$ that is a force to drive the linear movable portion 120. Here, the thrust $F_1$ can be calculated by multiplying a thrust constant $K_t$ by a value i of the linear side drive current. The thrust constant $K_t$ represents a magnitude of thrust generated per unit current, and is determined by the type of linear motor. The thrust $F_1$ branches as being output to the linear stationary portion 130 and a damper side mechanism unit 28. Note that the thrust $F_1$ being output to the damper side mechanism unit 28 represents the thrust $F_1$ acting as a reaction force against the damper shaft. A subtractor 17 is arranged between the thrust $F_1$ branchpoint and the linear stationary portion 130. The subtractor 17 subtracts disturbance $F_{Load}$ from the thrust $F_1$. Further, the subtractor 17 outputs a post-subtraction value to the linear stationary portion 130. The linear stationary portion 130 operates the linear movable portion 120 by using the post-subtraction thrust.

Here, although the linear side mechanism unit 18 has been described above, a further description is provided on some conceptual part of the description of the linear side mechanism unit 18. In reality, the linear side drive current is directly supplied to the linear stationary portion 130, whereby the linear movable portion 120 will be driven by the thrust $F_1$, before which the thrust $F_1$ is physically affected by the disturbance $F_{Load}$, and the linear movable portion 120 will actually be driven by this thrust after being affected. Here, the disturbance $F_{Load}$ is a reaction force acting on the linear movable portion 120 when a tool driven by the linear movable portion 120 contacts a work piece. In other words, this does not mean that the linear side drive current itself will directly be turned into the thrust $F_1$, from which the disturbance $F_{Load}$ is subtracted by way of an actual subtractor, the thrust $F_1$ subsequently being input to the linear stationary portion 130. However, for the sake of simplicity in illustration of FIG. 2, conceptual branchpoints are provided to explain the thrust $F_1$ acting as a reaction force against the damper shaft, and conceptual subtractors are provided to explain them being affected by the disturbance $F_{Load}$.

At any rate, the linear movable portion 120 is driven by the thrust affected by the disturbance $F_{Load}$. Then, along with this, the first linear scale 121 and the third linear scale 123 provided to the linear movable portion 120 are also driven. Then, the third detector 330 detects a new linear side magnetic pole position after the drive. The new linear side magnetic pole position detected is output to the subtractor 14 arranged between the linear side speed control unit 13 and the linear side current control unit 15.

On the other hand, the first detector 310 detects a new linear side positional feedback after the drive. The new linear side positional feedback detected is output to the subtractor 10 arranged between the high-level control device 111 and the linear side position control unit 11. In this manner, position loop control is implemented. Further, the linear side positional feedback branches upstream of the subtractor 10, and is also output to the linear side differentiation circuit 19.

The linear side differentiation circuit 19 differentiates this linear side positional feedback, thereby generating new linear side speed feedback. The linear side differentiation circuit 19 outputs the new linear side speed feedback generated to the subtractor 12 arranged between the linear side position control unit 11 and the linear side speed control unit 13. In this manner, speed loop control is implemented.

As described above, the linear movable portion 120 can be driven depending on the linear side position command, by performing the position loop control, the speed loop control, and the current loop control for each predetermined cycle.

Next, the damper shaft is described. Note that some descriptions overlapping with the above descriptions of the linear shaft will be omitted. At first, the damper side zero value output unit 211 outputs a damper side position command. As described above with reference to FIG. 1, the damper side position command is invariably zero. In other words, the damper side control unit 210 does not substantially provide any position command, and instead causes the damper movable portion 220 to remain at a predetermined position without actively moving in response to any position command. In this manner, when the damper shaft has moved due to any stress associated with movement of the linear side, the damper shaft will return to the original position.

A subtractor 20 is arranged between the damper side zero value output unit 211 and the damper side position control unit 21. The subtractor 20 subtracts the damper side positional feedback detected by way of the second detector 320, from the position command being output from the damper side zero value output unit 211. Here, the damper side positional feedback detected by way of the second detector 320 refers to "a current position of the damper movable portion 220 in relation to the machine base 400" as described above with reference to FIG. 1. Further, the subtractor 20 outputs a post-subtraction value to the damper side position control unit 21. Here, such a post-subtraction value serves as a damper side positional deviation amount.

The damper side position control unit 21 generates a damper side speed command by way of positional loop processing of performing a proportional operation, based on the damper side positional deviation amount, and outputs the damper side speed command generated to the damper side speed control unit 23.

Subsequent operations of the damper side position control unit 21, the subtractor 22, the damper side speed control unit 23, and the subtractor 24 are similar to the above-described operations of the linear side position control unit 11, the subtractor 12, the linear side speed control unit 13, and the subtractor 14; therefore, descriptions thereof are omitted.

The damper side current control unit 25 generates a damper side voltage command, based on a damper side current deviation amount being output from the subtractor 24 and a damper side magnetic pole position detected by way of the second detector 320. Here, the damper side magnetic pole position detected by way of the second detector 320 refers to "a current position of the damper movable portion 220 in relation to the machine base 400" as described above with reference to FIG. 2. The damper side current control unit 25 outputs the damper side voltage command generated to the damper side current amplifier 26.

Based on the damper side voltage command, the damper side current amplifier 26 switches the magnetic poles of the damper stationary portion 230, thereby forming a damper side drive current for driving the damper movable portion 220, and outputs the damper side drive current to the damper stationary portion 230. Subsequent descriptions assume that, in the drawings, the damper side drive current is output to the damper side mechanism unit 28 including the damper stationary portion 230.

Note that, on the other hand, the damper side current amplifier 26 generates damper side current feedback, based on the damper side drive current being output from itself. The damper side current amplifier 26 outputs the damper side current feedback generated to the subtractor 24 arranged between the damper side speed control unit 23 and the damper side current control unit 25.

Next, the damper side mechanism unit 28 is described. The damper side drive current being output to the damper side mechanism unit 28 (i.e. being output to the damper stationary portion 230) generates thrust $F_2$ that is a force to drive the damper movable portion 220. Here, likewise the thrust $F_1$, the thrust $F_2$ can be calculated by multiplying the thrust constant $K_t$ by the value i of the damper side drive current. The thrust $F_2$ is output to the damper stationary portion 230. A subtractor 27 is arranged between the damper side current amplifier 26 and the damper stationary portion 230. The subtractor 27 subtracts the thrust $F_1$ from the thrust $F_2$. This represents the thrust $F_1$ acting as a reaction force against the damper shaft. Further, the subtractor 27 outputs a post-subtraction value to the damper stationary portion 230. The damper stationary portion 230 operates the damper movable portion 220 by using the post-subtraction thrust.

Here, a description is provided on some conceptual part of the description of the damper side mechanism unit 28, similar to the linear side mechanism unit 18. In reality, the damper side drive current is directly supplied to the damper stationary portion 230, whereby the damper movable portion 220 will be driven by the thrust $F_2$, before which the thrust $F_2$ is physically affected by the linear shaft operated by the thrust $F_1$, and the damper movable portion 220 will actually be driven by this thrust after being affected. In other words, this does not mean that the damper side drive current itself will directly be turned into the thrust $F_2$, from which the thrust $F_1$ is subtracted by way of an actual subtractor, the thrust $F_2$ subsequently being input to the damper stationary portion 230. However, for the sake of simplicity in illustration of FIG. 2, conceptual subtractors are provided to explain them being affected by the thrust $F_1$.

At any rate, the damper movable portion 220 is driven by the thrust affected by the thrust $F_1$. Then, along with this, the second linear scale 222 provided to the damper movable portion 220 is also driven. Then, the second detector 320 detects a new current position after driving the damper movable portion 220 in relation to the machine base 400. The new current position detected is output, as damper side positional feedback, to the subtractor 20 arranged between the damper side zero value output unit 211 and the damper side position control unit 21. In this manner, positional loop control is implemented.

Further, the new current position detected by way of the second detector 320 branches upstream of the subtractor 20, and is output as damper side magnetic pole position feedback to the damper side current control unit 25.

In addition, the new current position detected by way of the second detector 320 further branches upstream of the subtractor 20, and is also output to the damper side differentiation circuit 29. The damper side differentiation circuit 29 differentiates this damper side positional feedback, thereby generating new damper side speed feedback. The damper side differentiation circuit 29 outputs the new damper side speed feedback generated to the subtractor 22 arranged between the damper side position control unit 21 and the damper side speed control unit 23. In this manner, speed loop control is implemented.

As described above, the damper shaft can absorb the force generated in the linear shaft, by performing the position loop control, the speed loop control, and the current loop control for each predetermined cycle. Specifically, vibration associated with a reaction force generated from the thrust $F_1$ of the linear shaft is not directly transmitted to the machine base 400, and instead, vibration associated with a reaction force subtracted by the thrust $F_2$ of the damper shaft will be transmitted to the machine base 400, achieving an effect that the vibration transmitted to the machine base 400 can be suppressed. In addition, in this case, it is only necessary to continue providing zero as a position command, achieving another effect that it is not necessary to perform control by generating complicated synchronization commands. Further, since it is not necessary to generate any complicated synchronization command, this will not cause any problem that, when the linear shaft and the damper shaft have different weights, complicated synchronization commands must be generated in consideration of the weight ratio between the linear shaft and the damper shaft, as in the technology disclosed in Patent Document 2. Therefore, for example, by making the damper shaft heavier in weight than the linear shaft, it is possible to easily achieve an effect such as allowing the damper shaft to more easily absorb the force generated in the linear shaft.

Next, a description is provided on the damper shaft having low-frequency characteristics which would not respond to high-frequency provided to the linear shaft. More specifically, according to the frequency characteristics, a high gain responds to a low frequency, and a low gain responds to a high frequency above a predetermined benchmark. The damper shaft has such frequency characteristics, whereby the damper shaft moves freely in response to high-frequency oscillation. Therefore, the linear shaft will move in a direction opposite to the damper shaft oscillating in a high-frequency of such as, for example, 100 Hz, whereby the damper shaft can more easily absorb the force generated in the linear shaft. On the other hand, a high gain responds to a low frequency, allowing the damper movable portion 220 to be positioned at the same position. Therefore, the damper movable portion 220 will remain at a specific position. Further, at a low frequency, the damper shaft will move at low acceleration, and the vibration thereof will be minute. Therefore, even if the damper shaft responds to this with a high gain to remain at a specific position, any problem such as generating vibration in the machine base 400 will not arise.

Such frequency characteristics can be realized by adjusting the parameters for determining the characteristics of the control loop for the positional control, the current control and the speed control by way of the damper side control unit 210. For example, such frequency characteristics can be realized by adjusting the proportional gain in the positional loop control. Note that the proportional gain in the positional loop control may also be referred to as a position gain. In addition, for example, the integral gain or the proportional gain in the speed loop control may be adjusted.

In this manner, according to the present embodiment, the frequency characteristics are changed by adjusting the parameters, whereby the damper shaft can have desirable characteristics as a damper. Therefore, a degree of freedom provided by the damper characteristics can be higher than, for example, the case of implementing the damper with a mechanism such as springs. This is because, when the damper is implemented by a mechanism such as springs, the springs need to be detached and replaced with other springs or the like, whereas only the parameters need to be changed according to the present embodiment.

The frequency characteristics of the damper shaft have been described above, which also means that, from the viewpoint of the linear shaft, the linear shaft has frequency characteristics such that a high gain responds to a high frequency, in comparison with the damper shaft. Namely, the above descriptions can be summarized as follows: the frequency band in which the damper side control unit 210 responds with a high gain (which corresponds to "a response band of the damper side control unit" of the present invention) may be a response band lower than a command frequency band provided to the linear side control unit 110 (which corresponds to "a command frequency band provided to the drive side control unit" of the present invention) or a frequency band in which the linear side control unit 110 responds with a high gain (which corresponds to "a response band of the drive side control unit" of the present invention).

Figure 3:
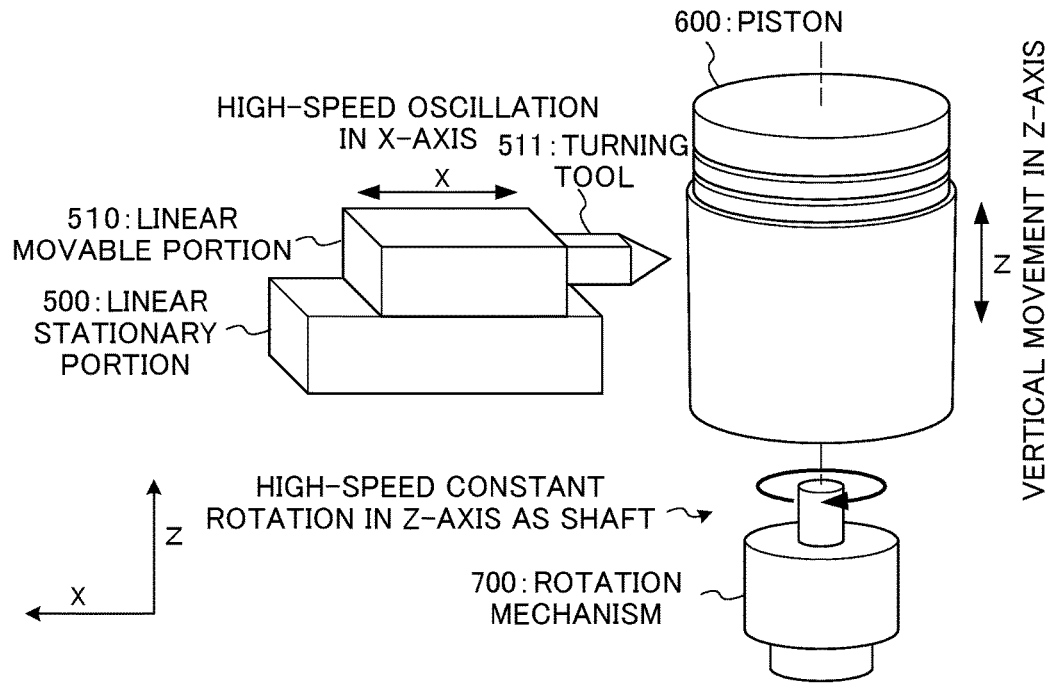
FIG. 3 is a diagram (1/2) illustrating an example of application of the embodiment of the present invention.

Next, examples of the application of the present embodiment are described with reference to FIGS. 3 and 4. FIG. 3 illustrates a linear stationary portion 500, a linear movable portion 510, a turning tool 511, a piston 600, and a rotation mechanism 700. The linear stationary portion 500 corresponds to the linear stationary portion 130. The linear movable portion 510 corresponds to the linear movable portion 120. The turning tool 511 for processing the piston 600 being a work piece is attached to the linear movable portion 510. The linear movable portion 510 oscillates in the X-axis direction at high speed, and along with this, the turning tool 511 also oscillates in the X-axis direction at high speed. On the other hand, the piston 600 is attached to the rotation mechanism 700. By way of the rotation mechanism 700, the piston 600 vertically moves in the Z-axis direction extending in the height direction orthogonal to the X-axis. Further, the piston 600 rotates around the Z-axis serving as a shaft, at a constant high speed. In this manner, high-speed oscillation in the X-axis direction by way of the linear movable portion 510, vertical movement in the Z-axis direction, and high-speed rotation around the Z-axis serving a shaft are performed by control such as computer numerical control, whereby the piston 600 can be processed.

Next, the reason why the movable portion oscillates in the X-axis direction at high speed is described. Assume that the cross section of the piston 600 has is a perfect circle as illustrated with the dashed line in the drawing, the piston 600 will rotate while maintaining a predetermined distance between the turning tool 511 and the piston 600, whereby the side surface of the piston 600 can be processed to a constant depth. However, for example, if the cross section of the piston 600 is elliptical as illustrated in FIG. 4, in order that the piston 600 is processed to a constant depth, each time the piston 600 rotates once at high speed, the linear movable portion 510 needs to reciprocate twice in the X-axis direction. However, when the linear movable portion 510 oscillates in the X-axis direction at high speed, vibration will be generated, and this vibration will be transmitted to the machine base. Accordingly, the configuration of the present embodiment comprising the damper shaft as described above is applied to the configurations of FIGS. 3 and 4, whereby vibration can be suppressed from being transmitted to the machine base.

Figure 4:
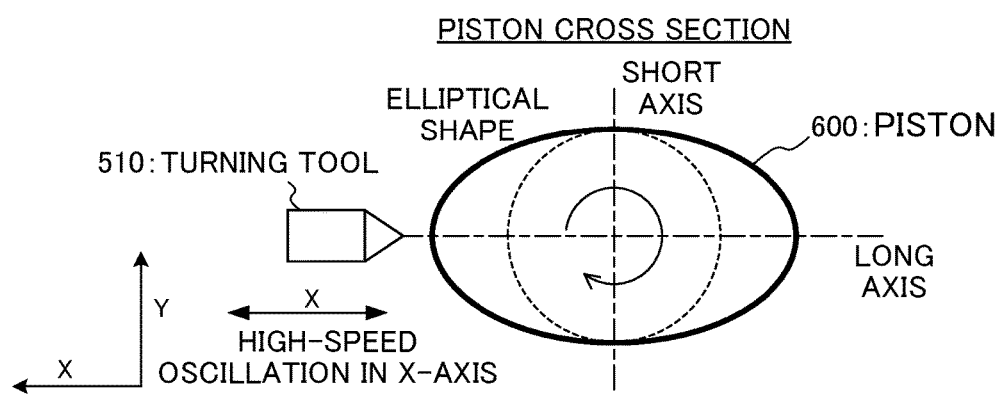
FIG. 4 is a diagram (2/2) illustrating another example of application of the embodiment of the present invention.

In this manner, the present embodiment can be applied to any arbitrary purpose, and it is particularly preferable if applied to a purpose in which, for example, the linear movable portion is required to oscillate at high speed, as illustrated in FIGS. 3 and 4. Examples of such a purpose, in which the linear movable portion 510 oscillates in the X-axis direction at high speed, may include, for example, screw-thread cutting processing of an inner surface of a cylindrical pipe.

The embodiments of the present invention have been described above. Although the above-described embodiments are the preferred embodiments of the present invention; the scope of the present invention shall not be restricted only to the above-described embodiments; and the present invention can be implemented in aspects with various alterations within a scope without departing from the spirit of the present invention.

An example of various modifications is described with reference to FIG. 5. According to the above-described embodiments, as described with reference to FIG. 1 and FIG. 2, a current position of the linear movable portion 120 in relation to the damper movable portion 220 (i.e. a linear side magnetic pole position) is detected by using the third linear scale 123 and the third detector 330. However, the third linear scale 123 and the third detector 330 can be omitted by altering the above-described embodiments. This configuration is described with reference to FIG. 5.

Figure 5:
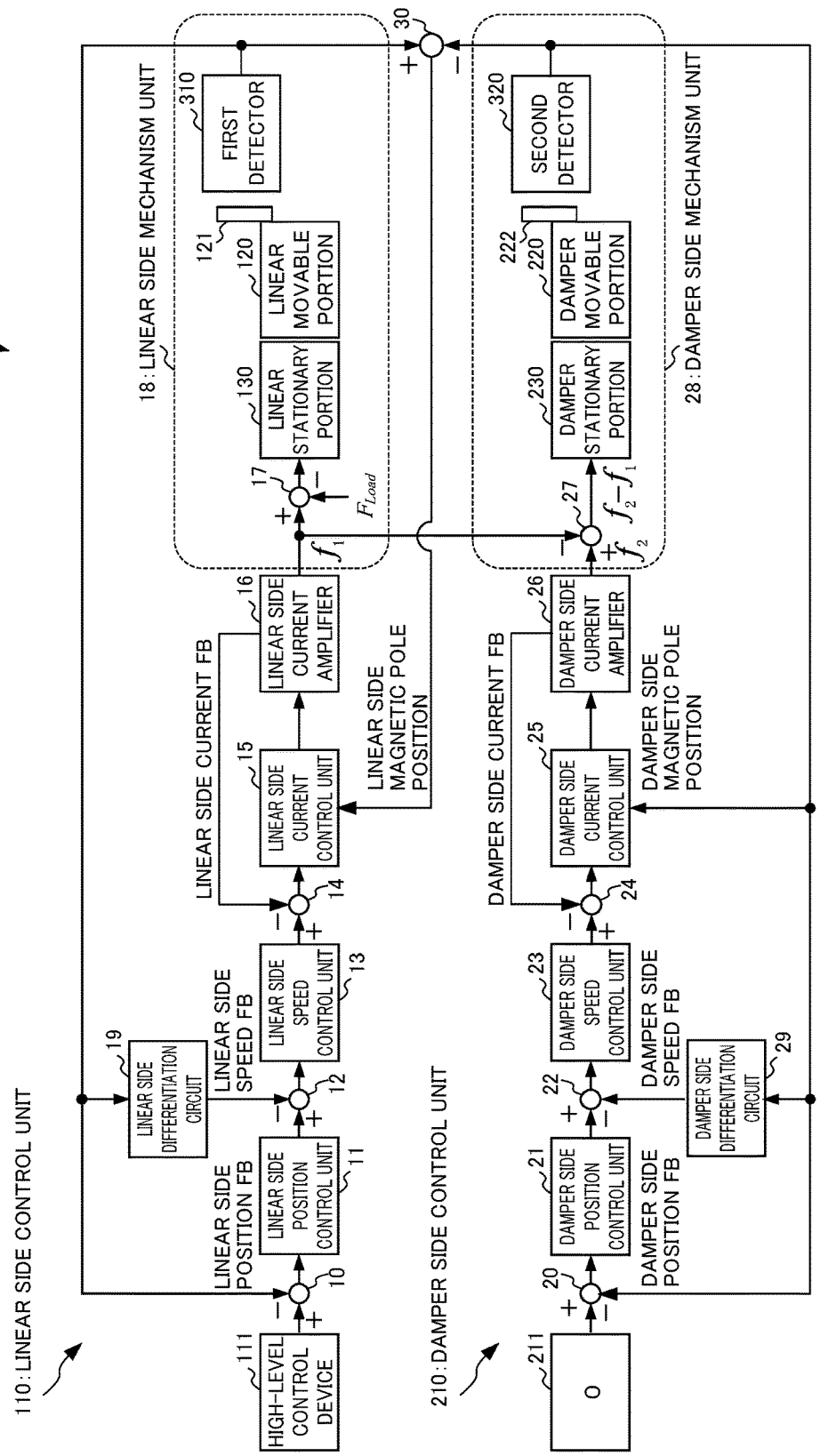
FIG. 5 is diagram illustrating a configuration and signal flow in relation to each control circuit according to an alternative embodiment of the present invention.

As illustrated in FIG. 5, the third linear scale 123 and the third detector 330 are omitted in the present alternative embodiment. On the other hand, a subtractor 30 is newly added, and each output of the first detector 310 and the second detector 320 branches as being output to the subtractor 30. The subtractor 30 subtracts the output of the second detector 320 from the output of the first detector 310, thereby calculating a difference therebetween, and outputs this difference, in place of the output of the third detector 330, to the linear side current control unit 15. In other words, according to the present embodiment, a difference between "a current position of the linear movable portion 120 in relation to the machine base 400" detected by way of the first detector 310 and "a current position of the damper movable portion 220 in relation to the machine base 400" detected by way of the second detector 320 is treated as "a current position of the linear movable portion 120 in relation to the damper movable portion 220 (i.e. a linear side magnetic pole position)" detected by way of the third detector 330.

In this manner, the configuration omitting the third linear scale 123 and the third detector 330 can perform control similar to the above-described embodiments.

The embodiments described above can be implemented by hardware, software or a combination thereof. Herein, the implementation by software means implementation by a computer that reads and executes a program. When configured with hardware, part or all of the embodiments can be configured with, for example, an integrated circuit (IC) such as LSI (Large Scale Integrated Circuit), ASIC (Application Specific Integrated Circuit), gate array, and FPGA (Field Programmable Gate Array).

In the case in which part or all of the embodiments is configured with a combination of software and hardware, a computer is configured with: a storage unit such as a hard disk and ROM which store a program describing all or part of the operations of the servo control apparatus illustrated in the flowchart; DRAM which store data necessary for computation; CPU; and a bus which connects each unit; in which information necessary for computation is stored in the DRAM, and the program is operated in the CPU, whereby all or part of the functions can be realized. A program is stored by using various types of computer-readable media, and can be supplied to a computer. The computer-readable media include various types of tangible storage media. Examples of the computer-readable media include: a magnetic recording medium (e.g. flexible disk, magnetic tape, hard disk drive), a magneto-optical recording medium (e.g. magneto-optical disk), CD-ROM (Read Only Memory), CD-R, CD-R/W, semiconductor memory (e.g. Mask ROM, PROM (Programmable ROM), EPROM (Erasable PROM), flash ROM, and RAM (random access memory)). EXPLANATION OF

REFERENCE NUMERALS

1 drive apparatus
10, 12, 14, 17, 20, 22, 24, 27, 30 subtractor
11 linear side position control unit
13 linear side speed control unit
15 linear side current control unit
16 linear side current amplifier
18 linear side mechanism unit
19 linear side differentiation circuit
21 damper side position control unit
23 damper side speed control unit
25 damper side current control unit
26 damper side current amplifier
28 damper side mechanism unit
29 damper side differentiation circuit
110 linear side control unit
111 high-level control device
112 linear side position speed unit
113 linear side current drive unit
121 first linear scale
123 third linear scale
120 linear movable portion
130 linear stationary portion
210 damper side control unit
211 damper side zero value output unit
212 damper side position speed unit
213 damper side current drive unit
222 second damper scale
220 damper movable portion
230 damper stationary portion
310 first detector
320 second detector
330 third detector
400 machine base
500 linear stationary portion
510 linear movable portion
511 turning tool 600 piston
700 rotation mechanism

What is claimed is:

1. A drive apparatus including a mechanical vibration suppression function, the drive apparatus comprising:
    a damper side linear motor including a stationary portion and a movable portion, the stationary portion being fixed to a machine base;
    a drive side linear motor including a stationary portion and a movable portion, the stationary portion being fixed to the movable portion of the damper side linear motor;
    a first detection unit that detects a first position that is a position of the movable portion of the drive side linear motor in relation to the machine base;
    a second detection unit that detects a second position that is a position of the movable portion of the damper side linear motor in relation to the machine base;
    a third detection unit that detects a third position that is a position of the movable portion of the drive side linear motor in relation to the movable portion of the damper side linear motor;
    a drive side control unit that controls the drive side linear motor, based on the first position detected by way of the first detection unit and the third position detected by way of the third detection unit; and
    a damper side control unit that controls the damper side linear motor, based on the second position detected by way of the second detection unit, thereby causing the damper side linear motor to function as a damper,
    wherein adjustment of a response band of the damper side control unit is allowed in accordance with a command frequency band provided to the drive side control unit or a response band of the drive side control unit, and
    wherein the adjustment is performed by adjusting a parameter used by the damper side control unit to control the damper side linear motor.

2. The drive apparatus including the mechanical vibration suppression function according to claim 1, wherein the response band of the damper side control unit is a response band that is lower than a command frequency band provided to the drive side control unit or a response band of the drive side control unit.

3. The drive apparatus including the mechanical vibration suppression function according to claim 1, wherein the third detection unit calculates a difference between the first position detected by way of the first detection unit and the second position detected by way of the second detection unit, and detects the third position from the difference calculated.

4. The drive apparatus including the mechanical vibration suppression function according to claim 1, wherein weight of the damper side linear motor is heavier than weight of the drive side linear motor.

5. The drive apparatus including the mechanical vibration suppression function according to claim 1, wherein the drive side linear motor is driven thereby causing the drive apparatus including the mechanical vibration suppression function to function as a machine tool.

6. A system including a mechanical vibration suppression function, the system comprising the drive apparatus including the mechanical vibration suppression function according to claim 1 and a high-level control device, wherein
    each of the drive side control unit and the damper side control unit is a control unit that performs feedback control, and
    the high-level control device provides a position command to the drive side control unit, and does not provide a position command to the damper side control unit.

* * * * *